(12) United States Patent
Parker et al.

(10) Patent No.: US 10,384,582 B2
(45) Date of Patent: Aug. 20, 2019

(54) TRUCK BED HANDLE APPARATUS

(71) Applicant: Step-N-Secure, LLC, Sarasota, FL (US)

(72) Inventors: M. Lawrence Parker, Longboat Key, FL (US); Joseph Brielman, Lakewood Ranch, FL (US)

(73) Assignee: Step-N-Secure, LLC, Sarasota, FL (US)

( * ) Notice: Subject to any disclaimer, the term of this patent is extended or adjusted under 35 U.S.C. 154(b) by 0 days.

(21) Appl. No.: 15/683,285

(22) Filed: Aug. 22, 2017

(65) Prior Publication Data

US 2018/0050620 A1 Feb. 22, 2018

Related U.S. Application Data

(60) Provisional application No. 62/377,854, filed on Aug. 22, 2016.

(51) Int. Cl.
| | | |
|---|---|---|
| *B60N 3/02* | (2006.01) | |
| *B25G 1/10* | (2006.01) | |
| *B60P 7/08* | (2006.01) | |

(52) U.S. Cl.
CPC ............. *B60N 3/02* (2013.01); *B25G 1/10* (2013.01); *B25G 1/102* (2013.01); *B60N 3/026* (2013.01); *B60P 7/0807* (2013.01)

(58) Field of Classification Search
CPC .......... B60N 3/02; B60N 3/023; B60N 3/026; B25G 1/102; B60P 7/0807
USPC ................... 296/1.02, 43; 410/110
See application file for complete search history.

(56) References Cited

U.S. PATENT DOCUMENTS

| | | | | |
|---|---|---|---|---|
| 5,676,508 A | * | 10/1997 | Weicht | B60P 7/0807 114/218 |
| 5,738,471 A | * | 4/1998 | Zentner | B60P 7/0807 410/101 |
| 8,251,423 B1 | * | 8/2012 | Lingle | B60R 3/00 296/1.02 |
| 8,393,657 B1 | * | 3/2013 | Duderstadt | B60R 3/00 293/117 |
| 8,678,457 B1 | * | 3/2014 | Duderstadt | B60R 3/00 16/429 |
| 9,022,445 B1 | * | 5/2015 | Duderstadt | B60N 3/023 296/1.02 |
| 9,649,965 B1 | * | 5/2017 | Burkhardt | B60N 3/026 |
| 2009/0133616 A1 | * | 5/2009 | Karnes | B62D 33/0207 116/173 |
| 2009/0322052 A1 | * | 12/2009 | Ruehl | B60R 3/00 280/166 |

(Continued)

*Primary Examiner* — Jason S Morrow
(74) *Attorney, Agent, or Firm* — Jovan N. Jovanovic; The Watson IP Group, PLC

(57) ABSTRACT

A truck bed handle apparatus including an elongated body, a central stop portion and a top cross portion. The elongated body extends from a proximal end to a distal end. The elongated body defines a lower pocket portion and an upper handle portion. The central stop portion is spaced apart from each of the proximal end and distal end. The central stop portion has a lower face that is structurally configured to interface with a pocket opening on a truck upon insertion of the lower pocket portion thereinto, so as to limit further insertion. The top cross portion is positioned between the central stop portion and the distal end.

8 Claims, 5 Drawing Sheets

(56) References Cited

U.S. PATENT DOCUMENTS

2010/0319161 A1* 12/2010 Manuel .................. B25G 1/102
                                                          16/110.1
2017/0320419 A1* 11/2017 Gobart ..................... B60N 3/02
2017/0355297 A1* 12/2017 Chimenti .............. B60P 7/0807
2018/0134199 A1*  5/2018 Mejia ..................... B62D 33/02

* cited by examiner

TRUCK BED HANDLE APPARATUS

CROSS-REFERENCE TO RELATED APPLICATION

The present application claims priority from U.S. Pat. App. Ser. No. 62/377,854 filed Aug. 22, 2016, entitled "Truck Bed Handle Apparatus," the entire specification of which is hereby incorporated by reference in its entirety.

BACKGROUND OF THE DISCLOSURE

1. Field of the Disclosure

The disclosure relates in general to vehicle aids, and more particularly, to a truck bed handle apparatus that is configured to be insertable into a pocket opening on a truck bed wall of, for example, a pickup truck.

2. Background Art

It is well known that trucks, such as pickup trucks, are among the most popular vehicles and rank among the best selling vehicles year after year. In addition to providing basic transportation, such vehicles provide the utility and ability to haul cargo. In particular, such vehicles have a truck bed which is generally surrounded by truck bed walls with a movable tailgate providing ingress/egress.

To enhance utility of the truck bed, the walls often are supplied with openings (often referred to as pocket openings) which allow for the vertical insertion of various structures (i.e., beams and the like that can form structures above the walls to enclose the bed). Additionally, hooks and the like can be coupled to these openings when securing loads with cables and cords.

Problematically, ingress and egress from the truck bed often requires a user to hop onto the truck bed. As the truck bed may be elevated, the user may be required to first kneel on the tailgate or to use another structure, such as a step stool or the like. In some instances a user will merely try and reach over the wall, even where a load is heavy, just to avoid climbing onto the truck bed.

SUMMARY OF THE DISCLOSURE

The disclosure is directed a truck bed handle apparatus including an elongated body, a central stop portion and a top cross portion. The elongated body extends from a proximal end to a distal end. The elongated body defines a lower pocket portion and an upper handle portion, with the lower pocket portion extendable into a pocket opening of a truck, and with the upper handle portion configured to receive the hand of the user (or to which straps and the like can be coupled).

The central stop portion is spaced apart from each of the proximal end and distal end. The central stop portion has a lower face that is structurally configured to interface with a pocket opening on a truck upon insertion of the lower pocket portion thereinto, so as to limit further insertion. The top cross portion is positioned between the central stop portion and the distal end.

It will be understood that in some configurations, multiple such handle apparatuses may be provided in a kit, along with, optionally, cables or straps to be coupled thereto.

In one aspect of the disclosure, the disclosure is directed to a truck bed handle apparatus comprising an elongated body, a central stop portion and a top portion. The elongated body extends from a proximal end to a distal end, and defining a lower pocket portion and an upper handle portion. The central stop portion is spaced apart from each of the proximal and distal end. The central stop portion has a lower face that is structurally configured to interface with a pocket opening on a truck upon insertion of the lower pocket portion thereinto, so as to limit further insertion. The top portion is positioned between the central stop portion and the distal end.

In some configurations, the elongated body further includes an upper handle portion and a lower pocket portion separated by the central stop portion.

In some configurations, the upper handle portion comprises a substantially circular cross-sectional configuration.

In some configurations, the lower pocket portion has a substantially rectangular cross-sectional configuration.

In some configurations, the central stop portion comprises a substantially rectangular configuration.

In some configurations, the top portion has a substantially circular cross-sectional configuration.

In some configurations, the handle member is formed about a central planar backbone extending between the proximal end and the distal end thereof.

In some configurations, a plurality of parallel transverse ribs and parallel longitudinal ribs extend on opposing sides of the central planar backbone, and each being parallel thereto, with the transverse ribs and the longitudinal ribs being substantially parallel to each other.

In some configurations, a trim member having an opening through which the lower pocket portion can be directed is provided. The trim member having an outer perimeter that is larger than the central stop portion.

In some configurations, the diameter of the top portion is larger than a thickness of the lower pocket portion, but smaller than a width of the lower pocket portion.

In another aspect of the disclosure, the disclosure is directed to a method of installing a truck bed handle apparatus comprising the steps of: providing the truck bed handle apparatus; providing a truck bed opening through which a lower pocket portion of the handle apparatus can be inserted; and inserting the truck bed handle apparatus through the truck bed opening until a central stop of the truck bed opening meets the truck bed opening.

In some configurations, the method further comprises the steps of: providing a trim panel; extending the lower pocket portion through an opening in the trim panel; and directing the lower pocket portion into the truck bed opening, to, in turn, sandwich the trim panel between a region surrounding the truck bed opening and the central stop of the truck bed handle apparatus.

In some configurations, the method further comprises the step of: providing a bolt; and directing the bolt through a portion of the truck bed and into the lower pocket portion of the truck bed handle apparatus, to sandwich the truck bed therebetween and to secure the truck bed handle apparatus thereto.

BRIEF DESCRIPTION OF THE DRAWINGS

The disclosure will now be described with reference to the drawings wherein.

DETAILED DESCRIPTION OF THE DISCLOSURE

Figure 1:
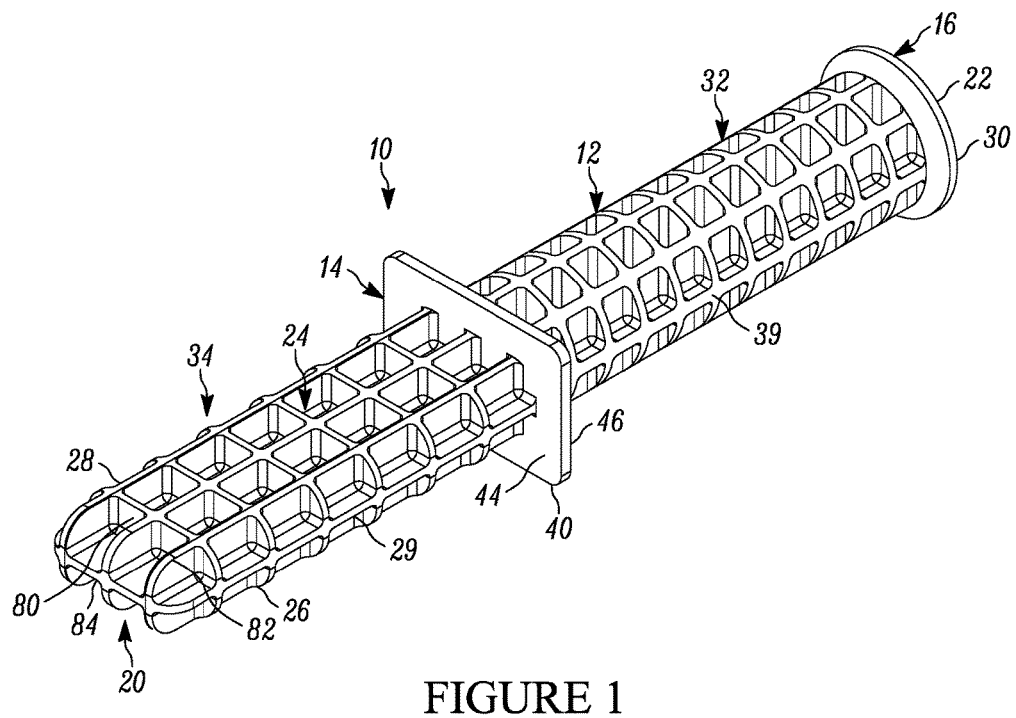
FIG. 1 of the drawings is a perspective view of the truck bed handle apparatus of the present disclosure.
Figure 2:
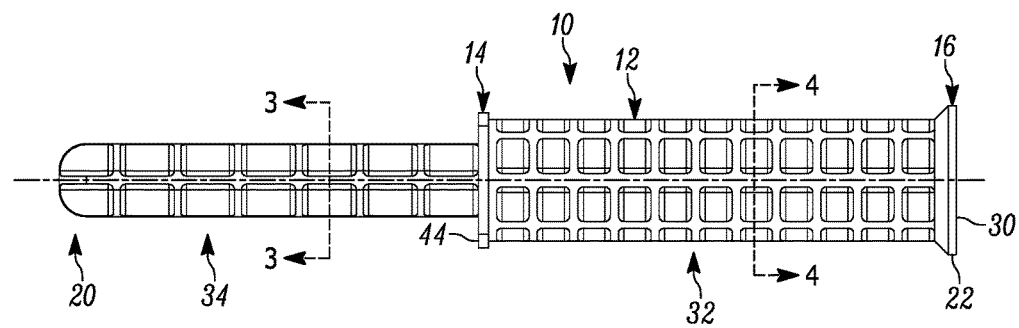
FIG. 2 of the drawings is a side elevational view of the truck bed handle apparatus of the present disclosure.
Figure 3:
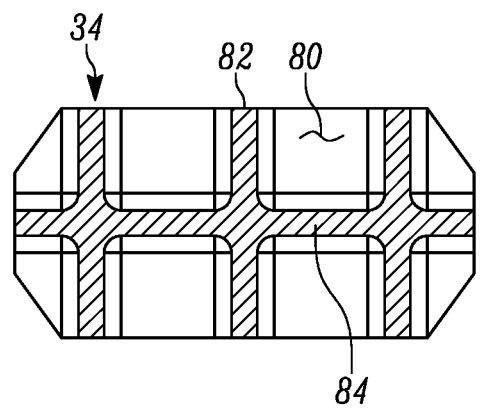
FIG. 3 of the drawings is a cross-sectional view of the truck bed handle apparatus of the present disclosure, taken generally about lines 3-3 of FIG. 2.
Figure 4:
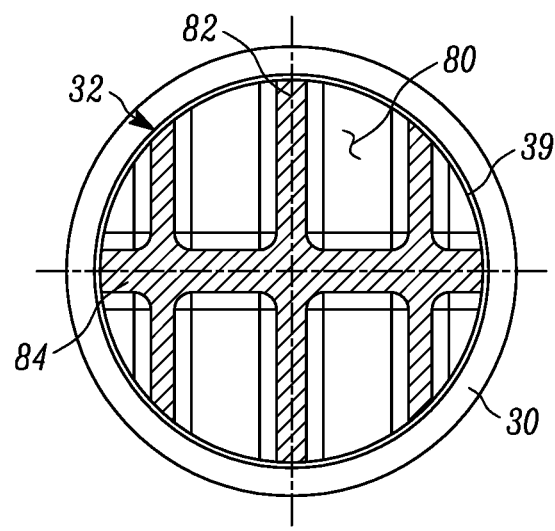
FIG. 4 of the drawings is a cross-sectional view of the truck bed handle apparatus of the present disclosure, taken generally about lines 4-4 of FIG. 2.
Figure 5:
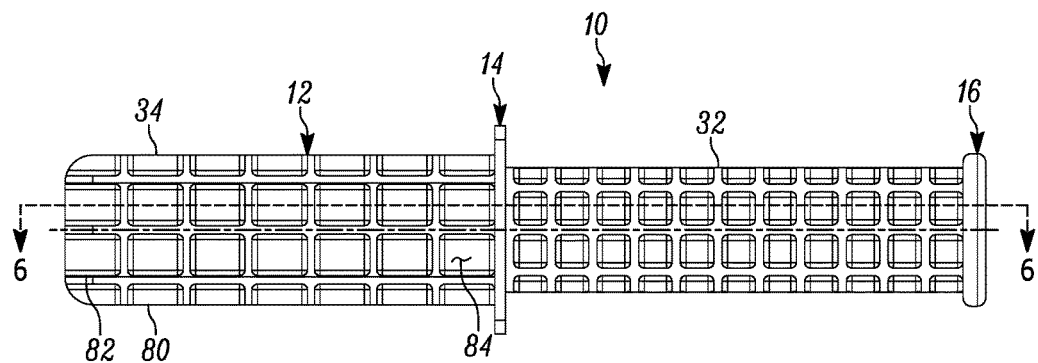
FIG. 5 of the drawings is a top plan view of the truck bed handle apparatus of the present disclosure.
Figure 6:
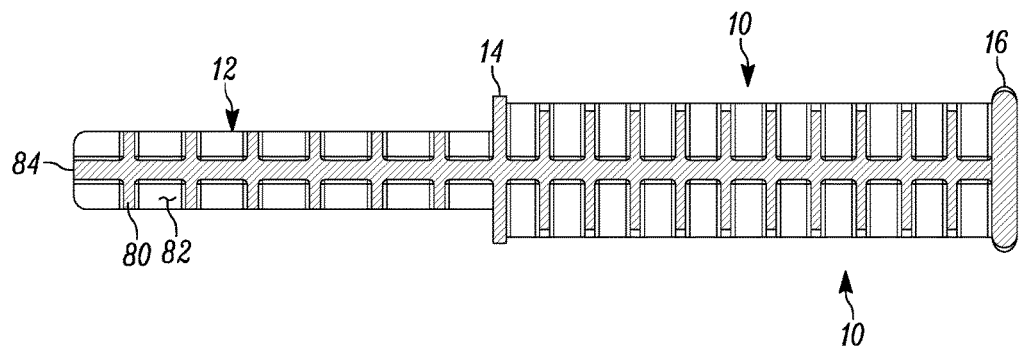
FIG. 6 of the drawings is a cross-sectional view of the truck bed handle apparatus of the present disclosure, taken generally about lines 6-6 of FIG. 5.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 8:
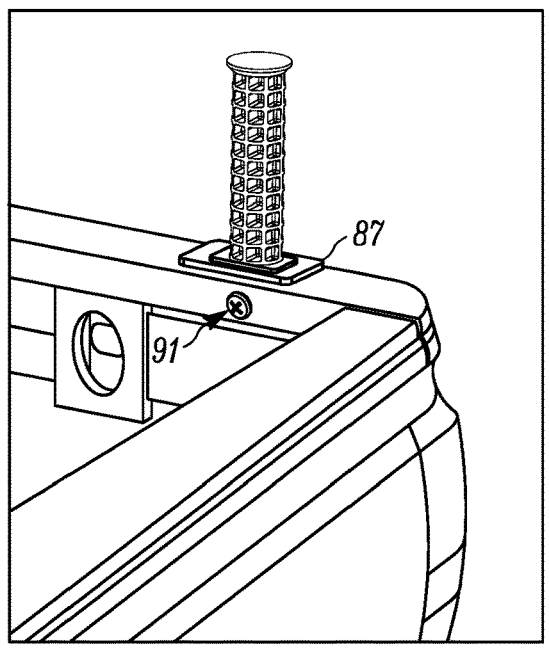
FIG. 8 of the drawings is a perspective view of a truck, showing, in particular, a truck bed handle apparatus of the present disclosure inserted within a pocket opening.
Figure 9:
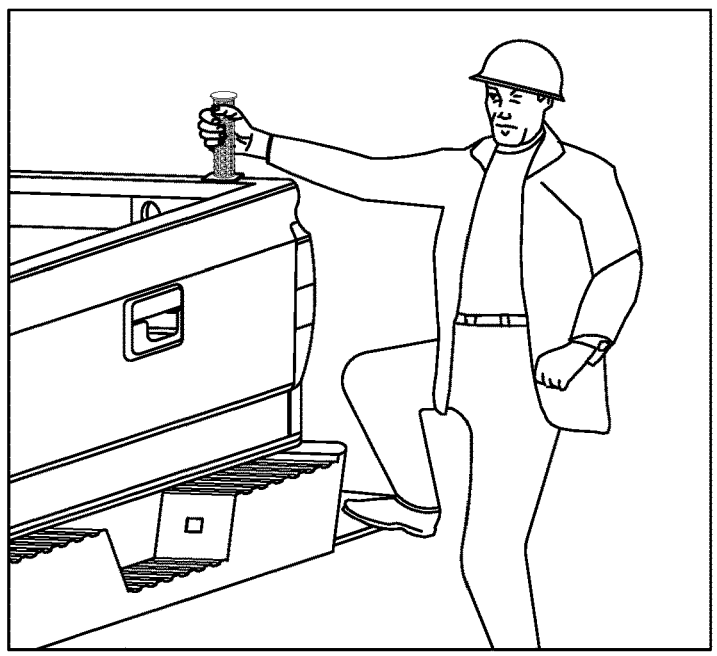
FIG. 9 of the drawings is a perspective view of a truck, showing, in particular, a truck bed handle apparatus of the present disclosure inserted within a pocket opening, with a user utilizing the same as a grasping handle.
Figure 10:
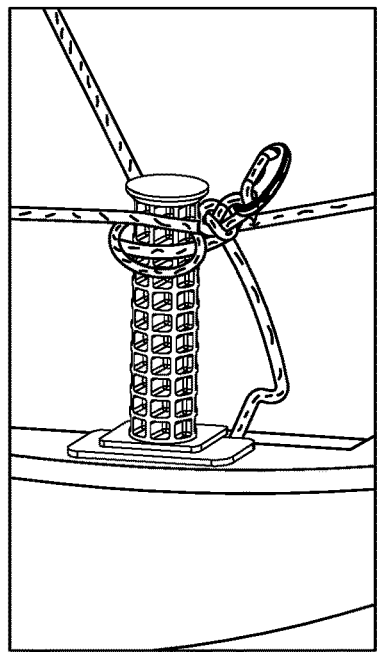
FIG. 10 of the drawings is a perspective view of a truck, showing, in particular, a truck bed handle apparatus of the present disclosure inserted within a pocket opening, with strapping attached thereto.

Referring now to the drawings and in particular to FIG. 1, the truck bed handle apparatus is shown generally at 10. With reference to FIGS. 8, 9 and 10, the truck bed handle apparatus is configured to fit into the pocket opening of a truck bed wall, including, but not limited to such pocket openings on conventional pickup trucks (i.e., quarter ton, half ton, three quarter ton and one ton). Of course, the use of the truck bed handle apparatus is not limited thereto, and it is contemplated that other uses may be incorporated.

Referring again to FIG. 1, the truck bed handle apparatus 10 includes elongated body 12, central stop portion 14 and top lip portion 16. In the configuration shown, the truck bed handle apparatus comprises a single integrally formed member, from, for example, a metal or alloy thereof. In other configurations, a composite material, or a molded (possibly fiber reinforced) polymer material is contemplated. In still other configurations, a polymer member may be utilized. In still other configurations, combinations thereof can be utilized.

The elongated body 12 includes proximal end 20 and distal end 22. As will be explained below, the central stop portion 14 and the top cross portion 16 divide the elongated body into an upper handle portion 32 and a lower pocket portion 34. In the configuration show, the cross-sectional configuration of the lower pocket portion of the elongated body is predominantly rectangular or square, thereby defining front face 24, back face 26, first side face 28 and second side face 29. The configuration is substantially of a rectangular cross-sectional configuration, with chamfered corners.

The upper handle portion comprises a substantially circular outer configuration defining an outer surface 39. An upper face 30 is presented at the upper end thereof. In some configurations, a plurality of openings may be extended through the upper handle portion between the front and back faces thereof.

The central stop portion 14 is shown in FIG. 1 as comprising substantially rectangular flange 40. The structures as shown are generally symmetrical and define a lower face 44 and upper face 46. The central stop portion is configured so that it is dimensionally larger than the stake pocket on the truck bed wall. As such, when the lower pocket portion is directed into a stake pocket on the truck bed wall, the central stop portion, and in particular, the lower faces 44, 46 thereof, preclude further inward movement. It is contemplated that an area of larger cross-section, or other structures may be incorporated into the lower pocket portion proximate to (and in some instances spaced apart from) the central stop portion to, in turn, provide a locking function so as to sandwich the structure that defines the pocket of the truck bed wall between such a structure and the central stop portion.

The top cross portion 16 is shown in FIG. 1 as comprising a substantially circular upper flange. The upper end of the top portion 16 defines the upper face 30 of the elongated body. The top cross portion 16 terminates the upper end of the apparatus. Between the central stop portion and the top cross portion, the user is provided with the upper handle portion which is configured and sized so as to be easily grasped and gripped by a user. Essentially, the top cross portion precludes a user's hand from slipping off the end of the apparatus when gripping.

In the configuration shown, the upper handle portion and the lower pocket portion of the handle member can be formed in a molding process (i.e., injection molded or the like), wherein the structure is formed from a plurality of parallel transverse ribs 80 and parallel longitudinal ribs 82 that are configured on a central planar backbone 84 which is orthogonal to both. Such a structure defines a plurality of recessed structures or voids 86 throughout the configuration.

It is contemplated that the different edges in the present configuration may be rounded or the like. It is further contemplated that the cross-sectional configuration in many instances may be other than rectangular or square, such as elliptical, round or the like. It will further be understood that the cross-sectional configuration of the lower pocket portion generally matches the configuration of the pocket in the truck bed wall. Of course, other configurations that preclude rotation and translation in the pocket are also contemplated (i.e., structures having voids and the like). It is contemplated that a flexible coating or material may be applied to the outside of the device to preclude scratching or damage to the underlying truck bed wall, and to facilitate handling of the upper handle portion while maximizing comfort.

Dimensionally, while a number of different structures are contemplated, it is contemplated that the lower pocket portion 34 is approximately 6" in length and that the upper handle portion, in combination with the central stop portion and the top cross portion, is approximately 12" in length. Of course, depending on the application, variations are contemplated.

It is contemplated that a plurality of these truck bed handle apparatuses are provided in a kit form so that the user can mount multiples in the different stake pockets in a truck bed wall. In other configurations, only a single handle apparatus may be provided. In still other configurations, the handle apparatus may be provided together with straps and the like that have hooks or other coupling mechanisms that can interface with the handle.

In operation, and with reference to FIGS. 8 through 10, the user can grasp a truck bed handle apparatus of the present disclosure. Next, the user can select the pocket opening of the truck bed wall in which to insert the handle apparatus. Once determined, the user can direct the lower pocket portion 34 into the pocket opening. The insertion continues until the lower faces 44 reaches the truck wall bed and preclude further insertion. The handle apparatus is now ready for use.

Figure 7:
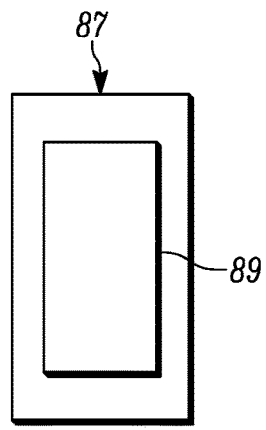
FIG. 7 of the drawings is a top plan view of a trim member for use with the truck bed handle apparatus of the present disclosure.

In some configurations, the opening may be of an odd shape that does not entirely match the shape of the lower pocket portion 34. In such a configuration, and with reference to FIG. 7, a trim panel, such as trim panel 87 can be utilized between the central stop portion 14 and the truck body. Such a trim panel has an inner opening 89 through which the handle can be directed, and the footprint is larger than the central stop portion.

In other configurations, it may be necessary to insert shims (not shown) so that the handle member is snug within the pocket opening of the truck bed wall. Additionally, a lag bolt or the like 91 (FIG. 8) can be driven through the truck bed proximate the pocket opening and into the handle member. Such a configuration further secures the handle member to the truck bed. The length of the bolt can be varied depending on the size and shape of the region around the handle member. In such configurations, typically, an opening is predrilled into the pocket opening, and in some configurations, predrilled into the handle member.

In use, the user can grasp the upper handle portion to assist with stepping up on to the tailgate or to hop over the truck bed wall. Additionally, where it is necessary to strap down a load, the user can utilize the openings in the elongated body for attachment points for straps having hooks and the like.

At any time, the user can remove the handle apparatus from within the pocket of the truck bed wall and stow the handle apparatus in the cab, a tool box or the like. Alternatively, even when not in use, the user can maintain the handle apparatus coupled to the stake pocket.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A truck bed handle apparatus comprising:
   an elongated body extending from a proximal end to a distal end, and defining a lower pocket portion and an upper handle portion, the lower pocket portion defining a substantially rectangular cross-sectional configuration structurally configured to engage an outer perimeter of pocket opening on a truck and the upper handle portion comprises a substantially circular cross-sectional configuration;
   a central stop portion spaced apart from each of the proximal and distal end, the central stop portion having a lower face that is structurally configured to interface with a pocket opening on a truck upon insertion of the lower pocket portion thereinto, so as to limit further insertion; and
   a top portion positioned between the central stop portion and the distal end, the top portion defining a flange extending outwardly from the upper handle portion,
   wherein the elongated body, the central stop portion and the top portion are integrally formed.

2. A truck bed handle apparatus comprising:
   an elongated body extending from a proximal end to a distal end, and defining a lower pocket portion and an upper handle portion, the lower pocket portion defining a cross-sectional configuration structurally configured to engage an outer perimeter of pocket opening on a truck;
   a central stop portion spaced apart from each of the proximal and distal end, the central stop portion having a lower face that is structurally configured to interface with a pocket opening on a truck upon insertion of the lower pocket portion thereinto, so as to limit further insertion; and
   a top portion positioned between the central stop portion and the distal end, the top portion defining a flange extending outwardly from the upper handle portion,
   wherein the elongated body, the central stop portion and the top portion are integrally formed; and
   wherein the central stop portion comprises a substantially rectangular configuration.

3. The truck bed handle apparatus of claim 2 wherein the top portion has a substantially circular cross-sectional configuration.

4. A truck bed handle apparatus comprising:
   an elongated body extending from a proximal end to a distal end, and defining a lower pocket portion and an upper handle portion;
   a central stop portion spaced apart from each of the proximal and distal end, the central stop portion having a lower face that is structurally configured to interface with a pocket opening on a truck upon insertion of the lower pocket portion thereinto, so as to limit further insertion; and
   a top portion positioned between the central stop portion and the distal end
   wherein the handle member is formed about a central planar backbone extending between the proximal end and the distal end thereof, and further comprising a plurality of parallel transverse ribs and parallel longitudinal ribs extending on opposing sides of the central planar backbone, and each being parallel thereto, with the transverse ribs and the longitudinal ribs being substantially parallel to each other.

5. The truck bed handle apparatus of claim 4 further comprising a trim member having an opening through which the lower pocket portion can be directed, the trim member having an outer perimeter that is larger than the central stop portion.

6. The truck bed handle apparatus of claim 1 wherein the diameter of the top portion is larger than a thickness of the lower pocket portion, but smaller than a width of the lower pocket portion.

7. A method of installing a truck bed handle apparatus comprising the steps of:
   providing the truck bed handle apparatus having a lower pocket portion defining a cross-sectional configuration structurally configured to engage an outer perimeter of the pocket opening on a truck;
   providing a pocket opening of a truck bed through which a lower pocket portion of the handle apparatus can be inserted;

inserting the truck bed handle apparatus through the pocket opening of the truck until a central stop of the truck bed handle apparatus meets the pocket opening, and with the lower pocket portion engaging the outer perimeter of the pocket opening;

providing a trim panel;

extending the lower pocket portion through an opening in the trim panel; and directing the lower pocket portion into the truck bed opening, to, in turn, sandwich the trim panel between a region surrounding the truck bed opening and the central stop of the truck bed handle apparatus.

8. The method of claim 7 further comprising the step of:

providing a bolt;

directing the bolt through a portion of the truck bed and into the lower pocket portion of the truck bed handle apparatus, to sandwich the truck bed therebetween and to secure the truck bed handle apparatus thereto.

* * * * *